(12) United States Patent
Samet et al.

(10) Patent No.: US 10,434,833 B1
(45) Date of Patent: Oct. 8, 2019

(54) ROTARY CUTTER WITH TORSIONAL SUSPENSION SYSTEM

(71) Applicant: Alamo Group Inc., Seguin, TX (US)

(72) Inventors: Daniel Claire Samet, Rankin, IL (US); Justin Anthony Hay, Gibson City, IL (US)

(73) Assignee: Alamo Group Inc., Seguin, TX (US)

( * ) Notice: Subject to any disclaimer, the term of this patent is extended or adjusted under 35 U.S.C. 154(b) by 222 days.

(21) Appl. No.: 15/492,749

(22) Filed: Apr. 20, 2017

Related U.S. Application Data

(60) Provisional application No. 62/325,186, filed on Apr. 20, 2016.

(51) Int. Cl.
| | | |
|---|---|---|
| *B60G 11/18* | (2006.01) | |
| *A01D 34/66* | (2006.01) | |
| *B60G 3/14* | (2006.01) | |
| *B60G 11/20* | (2006.01) | |
| *A01D 101/00* | (2006.01) | |

(52) U.S. Cl.
CPC ............ *B60G 11/183* (2013.01); *A01D 34/66* (2013.01); *B60G 3/14* (2013.01); *B60G 11/20* (2013.01); *A01D 2101/00* (2013.01); *B60G 2200/13* (2013.01); *B60G 2202/132* (2013.01); *B60G 2300/08* (2013.01)

(58) Field of Classification Search
CPC .......... B60G 2202/1424; B60G 11/183; B60G 11/225; B60G 2300/04; B60G 2200/132; B60G 2202/152; B60G 2204/126; B60G 2204/143; B60G 11/185; B60G 3/14; B60G 11/20; B60G 2300/08; B60G 2200/13; F16F 1/14; A01D 34/661; A01D 34/64; A01D 34/66

See application file for complete search history.

(56) References Cited

U.S. PATENT DOCUMENTS

| | | | | |
|---|---|---|---|---|
| 3,844,583 A | * | 10/1974 | Sakow ................... | B60G 11/20 267/273 |
| 4,917,402 A | * | 4/1990 | Reynolds ............. | B60G 11/185 267/154 |
| 4,921,231 A | * | 5/1990 | Reynolds ............. | B60G 11/185 16/308 |
| 5,163,701 A | * | 11/1992 | Cromley, Jr. ........ | B60G 11/185 267/285 |

(Continued)

OTHER PUBLICATIONS

U-19 / U-29 / U-35 Axle Assembly, AL-KO Kober Corp., http://www.al-ko.us/download/2200-3500IbRubber(2).pdf, (8 pages); Posted May 9, 2016.

*Primary Examiner* — Arpad Fabian-Kovacs
(74) *Attorney, Agent, or Firm* — Pizarro Allen PC

(57) ABSTRACT

A rotary cutter having a torsional suspension system may include a main frame, a deck supported by the frame, at least one rotary cutter mounted to the deck, at least one wheel, and a torsional suspension system connecting the at least one wheel to the frame. The torsional suspension system may include an outer tubular housing, an inner torsional tube disposed in the outer housing and configured to form cavities between the outer housing and the inner torsional tube, and elastomeric cords disposed in the cavities and configured for providing torsional resistance to rotation of the outer housing relative to the inner torsional tube.

20 Claims, 6 Drawing Sheets

(56) References Cited

U.S. PATENT DOCUMENTS

| | | | | |
|---|---|---|---|---|
| 5,277,450 A | * | 1/1994 | Henschen | B60G 11/183 267/276 |
| 5,326,128 A | * | 7/1994 | Cromley, Jr. | B60G 3/145 180/906 |
| 5,378,202 A | * | 1/1995 | Swinderman | B65G 45/16 198/499 |
| 6,003,888 A | | 12/1999 | Godbersen | |
| 6,299,259 B1 | | 10/2001 | Mackarvich | |
| 6,364,041 B1 | * | 4/2002 | Vangsgard | B60G 3/14 180/24.12 |
| 6,594,980 B2 | | 7/2003 | Oka et al. | |
| 6,877,728 B2 | * | 4/2005 | Gehret | B60G 11/22 267/279 |
| 8,191,911 B1 | * | 6/2012 | Reynolds | B60G 3/20 267/273 |
| 8,573,621 B1 | * | 11/2013 | Reynolds | B60G 3/20 267/273 |
| 8,727,363 B1 | * | 5/2014 | VanDenberg | B60G 11/225 267/273 |
| 8,789,838 B1 | | 7/2014 | Turnbow | |
| 9,802,660 B2 | * | 10/2017 | Johnson | B62D 55/1083 |
| 10,130,025 B2 | * | 11/2018 | Thorsell | A01B 63/16 |
| 2003/0005677 A1 | * | 1/2003 | Oka | A01D 34/661 56/229 |
| 2003/0106297 A1 | * | 6/2003 | Melone | A01D 34/64 56/15.8 |
| 2003/0140610 A1 | * | 7/2003 | Boyko | A01D 34/66 56/14.9 |
| 2005/0144923 A1 | * | 7/2005 | Melone | A01D 34/64 56/14.7 |
| 2006/0022424 A1 | * | 2/2006 | Reynolds | B60G 11/183 280/124.169 |
| 2009/0278328 A1 | * | 11/2009 | VanDenberg | B60G 3/14 280/124.13 |
| 2009/0278329 A1 | * | 11/2009 | VanDenberg | B60G 11/225 280/124.13 |
| 2010/0207346 A1 | * | 8/2010 | VanDenberg | B60G 11/225 280/124.128 |
| 2010/0270769 A1 | * | 10/2010 | VanDenberg | B60G 3/145 280/124.157 |
| 2013/0062854 A1 | * | 3/2013 | Gorrell | B60G 9/02 280/124.169 |

* cited by examiner

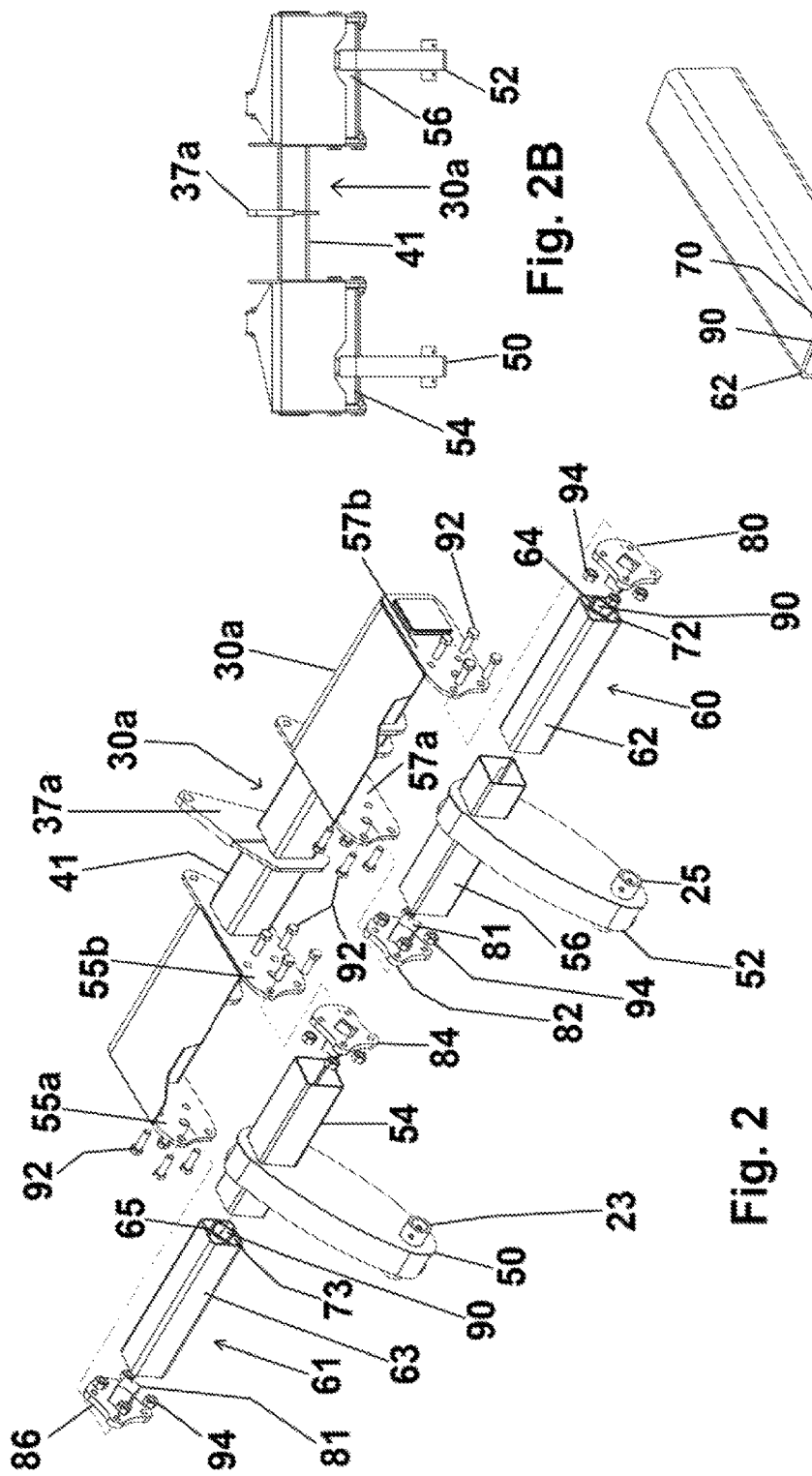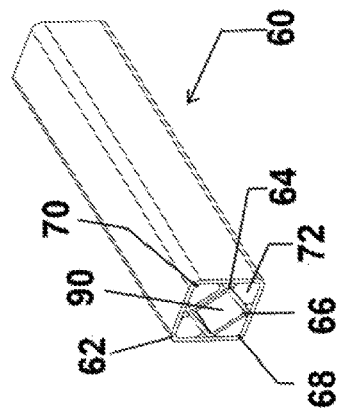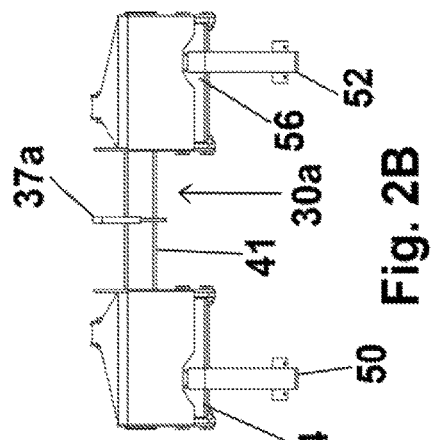

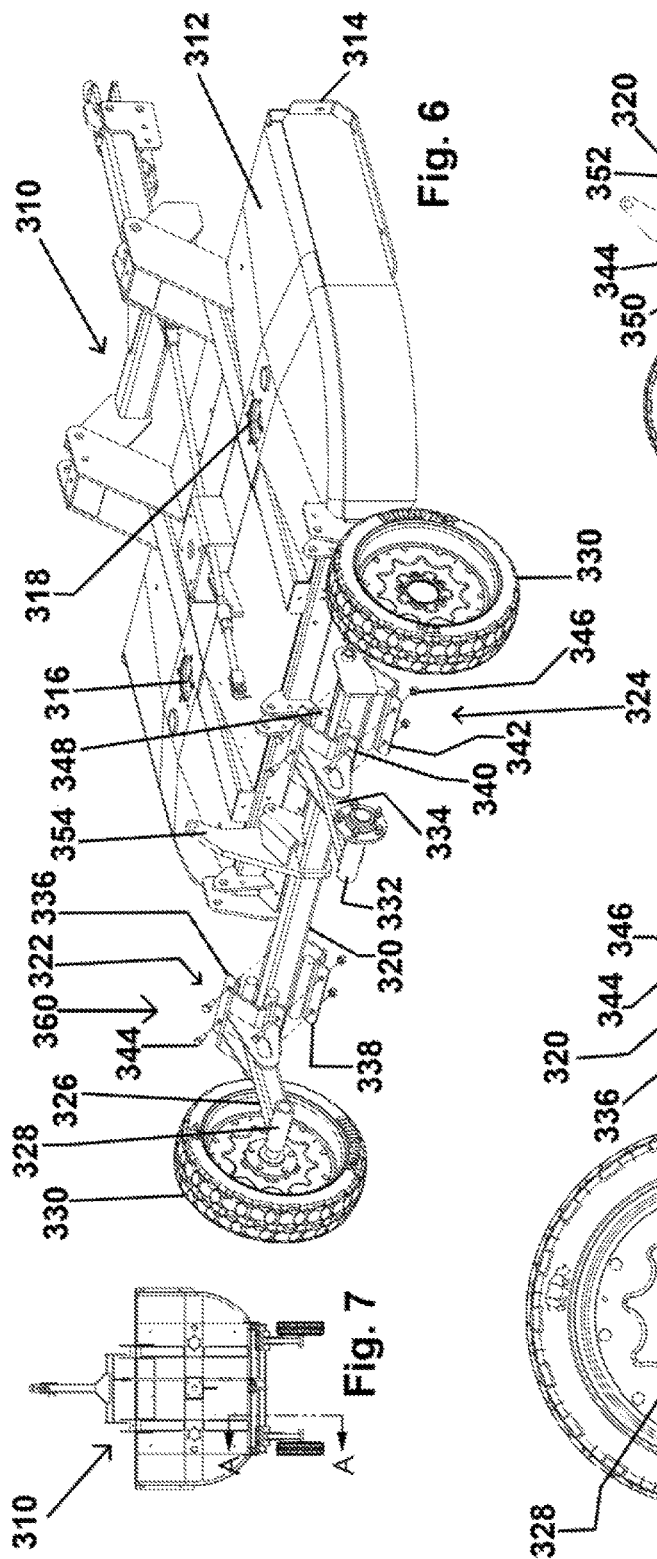

ROTARY CUTTER WITH TORSIONAL SUSPENSION SYSTEM

CROSS-REFERENCE TO RELATED APPLICATIONS

This application claims priority to U.S. Provisional Patent Application No. 62/325,186 filed Apr. 20, 2016, the disclosure of which is incorporated herein by reference.

BACKGROUND

The rotary cutter industry currently utilizes a variety of suspension systems for primary use on pull-type, flex-wing and rigid rotary cutters. Most use coil spring designs, rubber block designs, or an air bag design. Those suspension system designs are incorporated into the individual axle arms or cylinder lug portions of the axle or chassis. Significant disadvantages of those designs may include increased wear points due to required linkages and high spring rates necessary to control the static and dynamic loadings.

An example of an air bag design is disclosed in U.S. Pat. No. 6,594,980 B2 issued Jul. 22, 2003, which illustrates that an air spring may be coupled between a strut and a forward end of a rocker arm, and a pneumatic shock absorber may be coupled between the rocker arm and the strut at a location between the air spring and the connection of the rocker arm with the strut. While that design may provide for an effective suspension system, the design requires both air springs or air bags in addition to pneumatic shock absorbers. Those additional parts require increased maintenance and are both complicated in design. Also, extra installation and repair are required on those additional linkages.

It would be a significant advancement in the art to provide an improved suspension system for rotary cutters that is simpler and easier to maintain.

SUMMARY

The present disclosure is directed to a torsional suspension system for rotary cutters, such as those typically used to mow fields or highway right-of-way areas. The present application discloses the utilization of a torsional suspension system to which wheels may be mounted. Such a torsional suspension system may include tubular torsion assemblies disposed within tubular axle beams having a cross-sectional shape which is complementary to that of the torsion assemblies. Wheels may be mounted to axle arms depending from the axle beams. As the cutter traverses an uneven landscape rolling on the wheels, the torsional suspension system may dampen the up and down motion and control cutter bouncing. Such a system may reduce uneven cut results and high shock loads being transmitted to the cutter and towing tractor. In some embodiments, the tubular torsion assemblies may be in the form of cartridges that are easily removable and replaceable in the tubular axle beams, which may considerably reduce maintenance repair time and costs without having additional pivot points or required linkages.

In some embodiments, a rotary cutter with a torsional suspension system may include a main frame; a deck supported by the frame; at least one rotary cutter mounted to the deck; at least one wheel; and a torsional suspension system connecting the at least one wheel to the frame. The suspension system may include an axle arm attached at a first end to the at least one wheel and at a second end to a tubular axle beam; a torsion cartridge having an outer housing sized to be removably secured in the tubular axle beam, an inner torsional tube extending along an inside length of the outer housing and configured to form cavities between the outer housing and the inner torsional tube, and elastomeric cords extending along the inside length of the outer housing within the cavities and configured for providing torsional resistance to rotation of the outer housing relative to the inner torsional tube; and at least one end plug configured for non-rotational engagement with the inner torsional tube, the at least one end plug being fixed with respect to the frame.

In some embodiments, a rotary cutter with a torsional suspension system may include a main frame; a deck supported by the frame; at least one rotary cutter mounted to the deck; at least one wheel; and a torsional suspension system connecting the at least one wheel to the frame. The suspension system may include an axle arm attached at a first end to the at least one wheel and at a second end to a torsion insert housing; an inner torsional tube extending along an inside length of the torsion insert housing and configured to form cavities between the torsion insert housing and the inner torsional tube; elastomeric cords extending along the inside length of the torsion insert housing within the cavities and configured for providing torsional resistance to rotation of the torsion insert housing relative to the inner torsional tube; and at least one end plug configured for non-rotational engagement with the inner torsional tube, the at least one end plug being fixed with respect to the frame.

In some embodiments, a rotary cutter with a torsional suspension system may include a main frame; a deck supported by the frame; at least one rotary cutter mounted to the deck; at least one wheel; and a torsional suspension system connecting the at least one wheel to the frame. The suspension system may include a tube pivotally mounted to the frame; a clamp including two or more brackets fastened about the tube; at least one elastomeric cord disposed in a space formed between the tube and the clamp; and an axle arm depending from one of the brackets, wherein the at least one wheel is mounted to the axle arm.

BRIEF DESCRIPTION OF THE DRAWINGS

FIG. 2 is an exploded perspective view of a central portion of the torsional suspension system of FIG. 1.

FIG. 2A is a perspective view of a torsional insert cartridge of FIG. 2.

FIG. 2B is a top plan view of the central portion of the torsional suspension system of FIG. 2 shown in an assembled condition.

FIG. 6 is a perspective, partially exploded view of another rotary cutter having a torsional suspension system. Some details are not shown for the sake of clarity.

FIG. 7 is a top plan view of the rotary cutter of FIG. 6.

FIG. 8 is a cross-sectional view taken in the direction of section A-A of FIG. 7.

FIG. 9 is a cross-sectional view similar to FIG. 8 showing an alternate clamp configuration.

DETAILED DESCRIPTION

Figure 1:
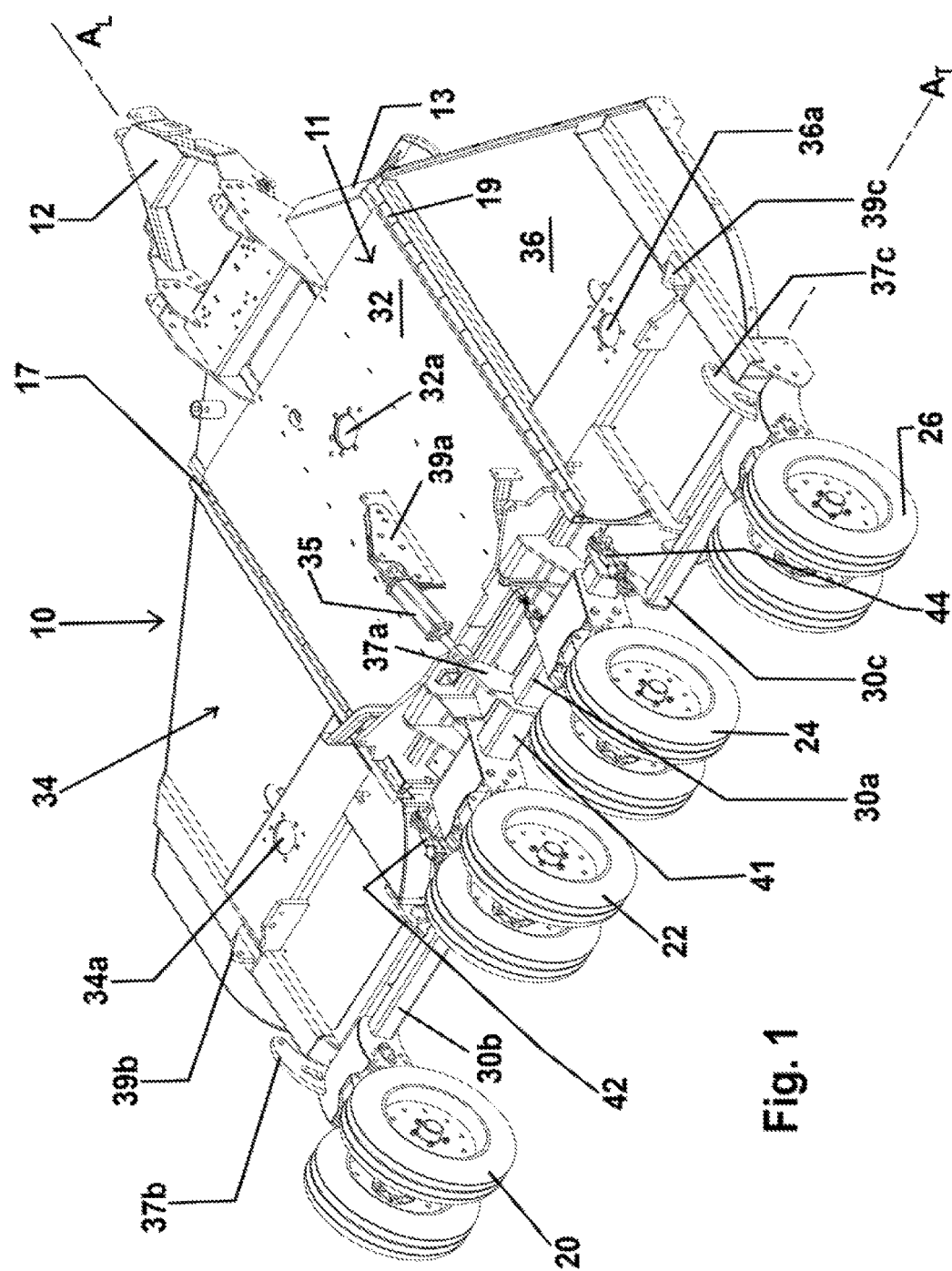
FIG. 1 is a perspective view of a rotary cutter having a torsional suspension system. Some details are not shown for the sake of clarity.
Figure 5:
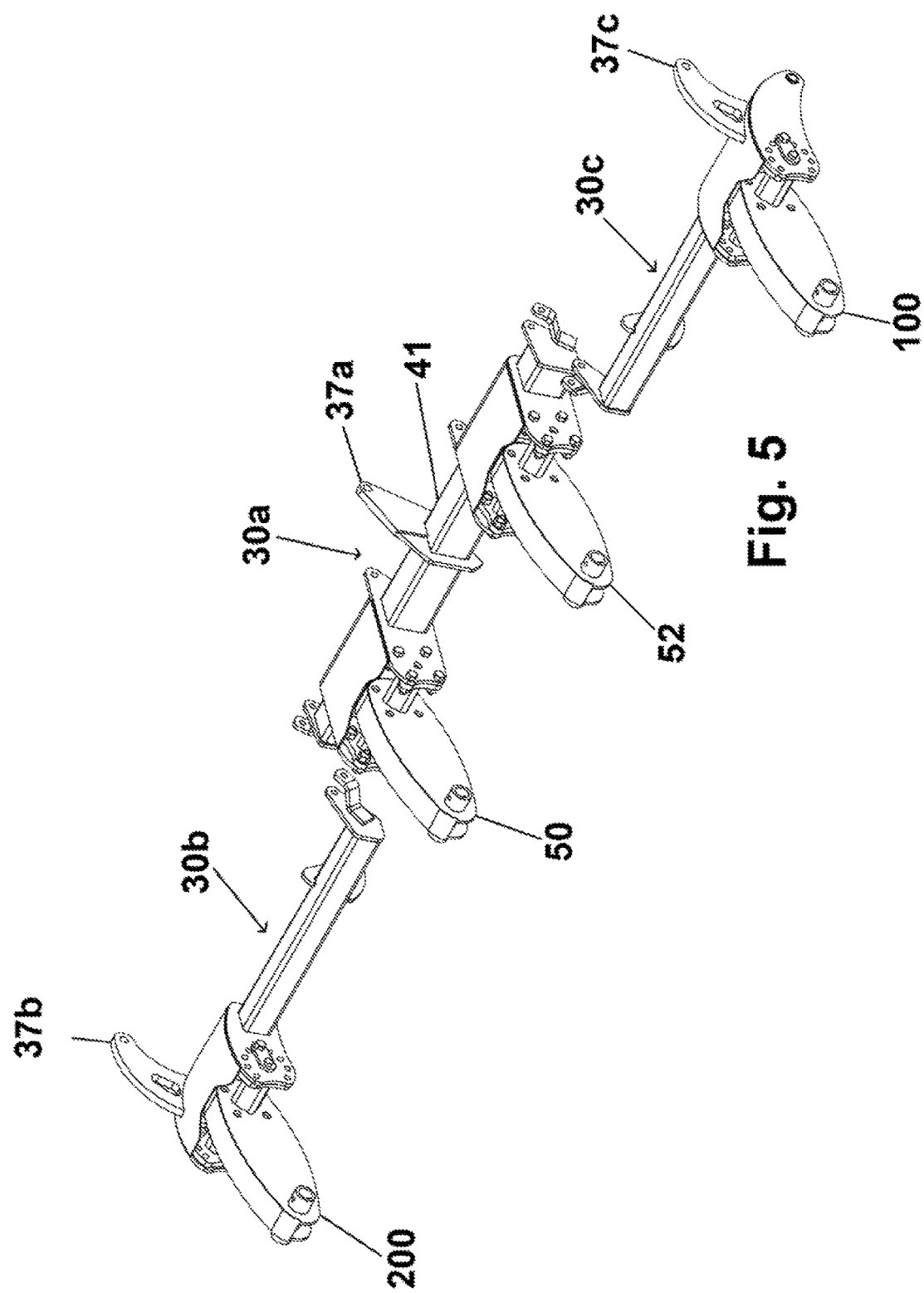
FIG. 5 is a perspective view of the torsional suspension system of FIG. 1.

Referring to FIG. 1, a flex-wing rotary cutter 10 may include a deck 11 affixed to a supporting frame 13 configured for being pulled via a hitch member 12 over the terrain on a plurality of ground wheels, which may include left and right pairs of central tandem wheels 22 and 24 and left and right pairs of tandem outer wing wheels 20 and 26, for example. Referring also to FIG. 5, each pair of wheels 20, 22, 24, 26 may be mounted to an axle arm 200, 50, 52, 100, respectively, each of which may be part of a torsional suspension system as described further below. As shown in FIG. 1, a left wing 34 may be coupled to a left edge of the middle section 32 of deck 11 by a hinge 17, and a right wing 36 may be coupled to a right edge of the middle section 32 by a hinge 19. As will be understood by persons of ordinary skill in the art, left wing 34 and right wing 36 may be rotated about hinges 17 and 19, respectively, and placed in substantially vertical stowed positions when rotary cutter 10 is in transit or not in use. Flex wings 34 and 36 may utilize lift mechanisms (e.g., hydraulic or pneumatic cylinders), well known in the art, to raise and lower the wings 34, 36 for operational purposes. Such mechanisms are not shown in the Figures to maintain clarity of the drawings. Other features not shown in the Figures but known in the art may include: (a) a self-leveling hitch mechanism mounted to hitch 12 and coupled to the central suspension assembly 30a for self-leveling the hitch in response to the operation of the central lift cylinder 35 described further below; (b) cutter blades mounted through openings 32a, 34a, and 36a in the middle deck 32, left wing 34, and right wing 36; and (c) gear boxes, drive motors, and power transmission assemblies to drive the cutter blades.

Still referring to FIGS. 1 and 5, a torsional suspension system of rotary cutter 10 may include a central suspension assembly 30a, a left suspension assembly 30b, and a right suspension assembly 30c, each of which may be mounted to frame 13 in a manner to permit limited rotation about a transverse axis of rotation (e.g., an axis $A_T$ substantially perpendicular to the direction of travel along central longitudinal axis $A_L$ of rotary cutter 10) in order to position frame 13 and the cutter blades at a desired elevation above the ground. The transverse axis of rotation for each of central suspension assembly 30a, left suspension assembly 30b, and right suspension assembly 30c may be the same or different. For example, pivotal movement of each suspension assembly 30a, 30b, and 30c about its transverse axis may be achieved by extensible and retractable hydraulic or pneumatic lift cylinders attached to frame 13, deck 11, or wings 34, 36 and lift arms 37a, 37b, and 37c, respectively. FIG. 1 shows one such connection with hydraulic lift cylinder 35 coupled between lift arm 37a fixed to a transverse tube 41 of central suspension assembly 30a and a central lift bracket 39a fixed to the top of middle deck section 32. For the sake of clarity, left and right wing lift cylinders are not shown but would be understood by one of ordinary skill in the art as coupling between left wing lift arm 37b and left lift bracket 39b and, similarly, coupling between right wing lift arm 37c and right lift bracket 39c.

Referring to FIGS. 1 and 2, with respect to central suspension assembly 30a, central wheel sets 22 and 24 may be rotationally attached to axles 23 and 25 of axle arms 50 and 52, respectively. Axle arms 50 and 52 may be fixed to and depend from tubular axle beams 54 and 56, respectively, of central suspension assembly 30a. For example, each of beams 54 and 56 may be a hollow tubular structure having a generally square cross-sectional shape. Of course, any suitable cross-sectional shape may be used. Beam 54 may be attached in spaced apart relationship from beam 56 in central suspension assembly 30a at flanges 55a and 55b using bolts 92 and nuts 94, for example. Similarly, beam 56 may be attached in spaced apart relationship from beam 54 in central suspension assembly 30a at flanges 57a and 57b using bolts 92 and nuts 94, for example. FIG. 2B is a top assembled view of the central suspension assembly 30a showing the spaced apart relationship of beams 54 and 56. In some embodiments, transverse tube 41, which may have lift arm 37a affixed thereto, may maintain the spaced apart relationship of beams 54 and 56. Beam 54 may be configured for receiving a torsion cartridge 61, and beam 56 may be configured for receiving a torsion cartridge 60. Although beams 54 and 56 and torsion cartridges 60 and 61 are illustrated as having a generally square cross-sectional shape, any suitable complementary cross-sectional shape may be used such that torsion cartridges 60 and 61 may be disposed within beams 56 and 54, respectively, wherein torsion cartridges 60, 61 are substantially prevented from rotating with respect to beams 56, 54.

As shown in FIG. 2A, torsion cartridge 60 may have a substantially square tubular insert housing 62 sized and shaped to be removably secured and retained in beam 56. A substantially square inner torsional tube 64 may be disposed within housing 62 and extend along an inner length of housing 62 with corners 66 rotatably offset from inner corners 68 of housing 62. These corner offsets may form longitudinal substantially triangular corner cavities 70 at the inner corners 68 of the tubular housing 62. Elastomeric or rubber cords 72 may extend along the length of the housing 62 within the substantially triangular corner cavities 70. Inner torsional tube 64 may be fixed with respect to central suspension assembly 30a by end plugs 80, 82 (see FIG. 2) as described further below. Cords 72 may be of variable compressibility and may provide torsional resistance to rotation of the substantially square housing 62 with respect to inner torsional tube 64. Because the substantially square housing 62 is sized and shaped to closely fit within beam 56, when the axle arm 52 is urged in a rotational motion (e.g., when wheels 24 encounter a discontinuity in the ground terrain being traversed), such rotation is torsionally resisted due to compression of cords 72 between housing 62 and inner torsional tube 64, yet cords 72 may enable axle arm 52 to rotate sufficiently to absorb wheel bounce and vibration.

As shown in FIG. 2, beam 54 may have a similar torsional axle insert cartridge 61 having an insert housing 63 sized and shaped to be removably secured in beam 54. Torsion cartridge 61 may be substantially the same as torsion cartridge 60 described above, with an inner torsional tube 65 extending along an inner length of housing 63 with corners rotatably offset to form longitudinal substantially triangular corner cavities with elastomeric cords 73 extending along the length of the housing 63 within the triangular corner cavities. Inner torsional tube 65 may be fixed with respect to central suspension assembly 30a by end plugs 84, 86 as described further below. Thus, both axle arms 50 and 52 may operate in a similar fashion as described above.

As shown in FIG. 2, end plugs 80, 82, 84, and 86 may have substantially square journals 81 sized and shaped to closely fit within the open ends 90 of the substantially square inner torsional tubes 64, 65. Although substantially square cross-sectional shapes are illustrated for journals 81 and tubes 64, 65, persons of ordinary skill in the art will understand that any suitable complementary cross-sectional shapes may be used for non-rotational engagement between journals 81 and tubes 64, 65. The end plugs 80, 82, 84, and 86 may retain each insert assembly in the axle beams 54 and 56 when the plugs are urged against the open ends 90 of tubes 64, 65 with the journals 81 snugly engaging within the open ends 90. End plugs 80, 82, 84, and 86 may be attached to central axle 30a via suitable fasteners (e.g., bolts 92 and nuts 94).

Figure 3:
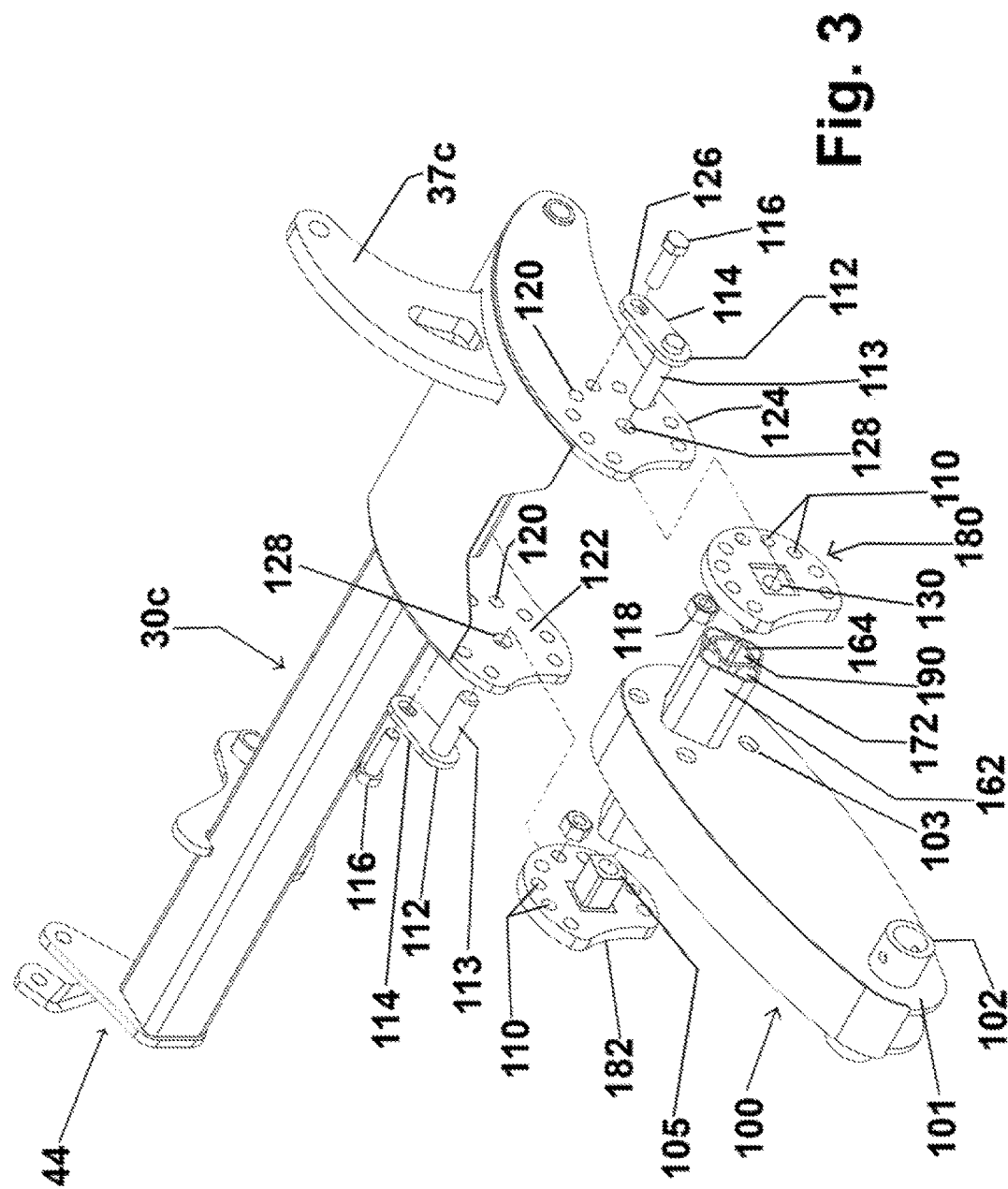
FIG. 3 is an exploded perspective view of a right wing portion of the torsional suspension system of FIG. 1.

Referring to FIG. 3, an exploded perspective view of right suspension assembly 30c is shown. The left suspension assembly 30b (see FIG. 5) may be a mirror image of right suspension assembly 30c. In FIG. 3, details of the construction of right suspension assembly 30c are shown. Axle arm 100 may attach at a first end 101 to right wing wheel set 26 (see FIG. 1) via axle 102, and a second end 103 of axle arm 100 may be mounted to a torsion insert housing 162. In some embodiments, axle arm 100 may be mounted approximately at an intermediate position along the length of housing 162 in order to provide balanced torsional and bending loading of housing 162 between end plugs 180, 182. Torsion insert housing 162 may have a substantially square tubular configuration, and a torsional insert tube 164 and elastomeric cords 172 (similar in construction and operation to cartridges 60 and 61 discussed above) may be inserted and retained in torsion insert housing 162. Again, although substantially square cross-sectional shapes are illustrated for housing 162 and tube 164, persons of ordinary skill in the art will understand that any suitable complementary cross-sectional shapes may be used for limited rotational movement of tube 164 within housing 162 due to torsional compression of elastomeric cords 172. End plugs 180 and 182 may be of a slightly different construction than plugs 80, 82, 84, and 86 shown in FIG. 2. Although plugs 180 and 182 may have substantially square journals 105 sized and shaped to closely fit for engagement within the open ends 190 of the inner torsional tubes 164 to substantially prevent rotation of inner torsional tubes 164 with respect to journals 105, plugs 180 and 182 may further have a plurality of holes 110 which may cooperate with bolts 116, axle pins 112, and holes 120 in plates 122, 124 of suspension assembly 30c to permit height adjustment of axle 102 (and hence wheel set 26). Each axle pin 112 may have a shaft 113 that may be inserted into hole 128 of plate 122 or 124 and hole 130 of plug 180 or 182. Shaft 113 may be sized so as to permit rotation of shaft 113 within holes 128 and 130. Each axle pin 112 may also have an arm 114 having a hole 126 therein configured to receive bolt 116. By aligning a desired hole 110 with a desired hole 120 and hole 126, placing pin 116 through the selected holes 110, 120 and hole 126, and securing a nut 118 to bolt 116, axle arm 100 may be placed in a desired angular position with respect to plates 122, 124 of suspension assembly 30c such that axle 102 (and hence wheel set 26) may be placed at a desired height with respect to frame 13 and deck 36 (see FIG. 1). This feature enables the operator of flex-wing rotary cutter 10 to vary the height of the cutter blades with respect to the ground in order to cut grass, brush, or other plant material at a desired height.

Figure 4:
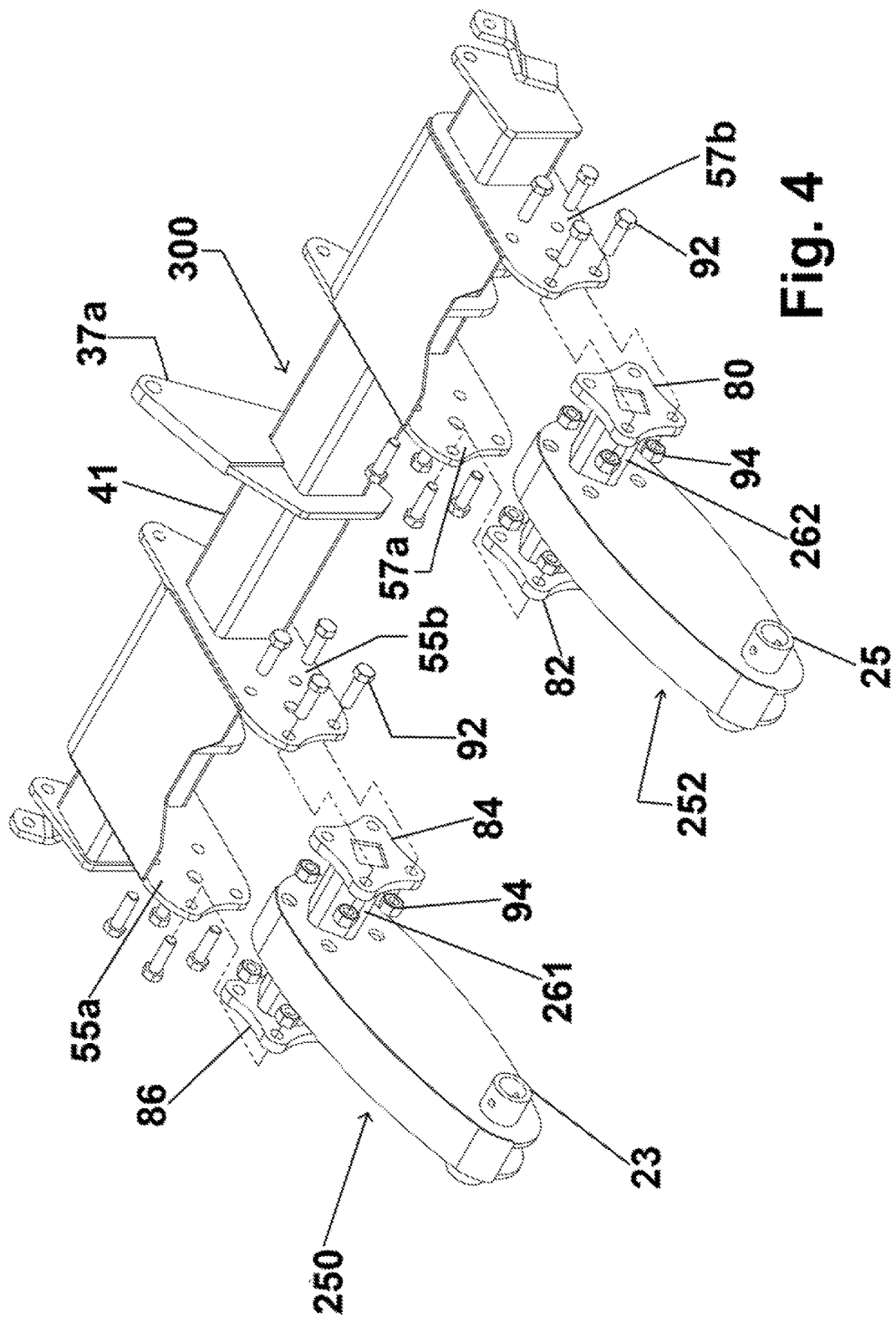
FIG. 4 is an exploded perspective view of another embodiment of a central portion of a torsional suspension system.

Referring to FIG. 4, an alternative embodiment of a central suspension assembly 300 is shown. Central suspension assembly 300 may be similar to central suspension assembly 30a of FIG. 2 except that rather than having a hollow beam configured for receiving a removable and replaceable torsion cartridge, each axle arm 250, 252 of central suspension assembly 300 may be fixed to a hollow tube 261, 262 in which a torsional insert tube and elastomeric cords (not shown, similar to torsional insert tube 164 and elastomeric cords 172 described above in connection with FIG. 3) may be inserted. Plugs 80, 82, 84, 86 may be installed in the open ends of the torsional insert tubes as described above with respect to FIG. 2, and plugs 80, 82, 84, 86 may be fastened to plates 55a, 55b, 57a, 57b with bolts 92 and nuts 94 as described above with respect to FIG. 2. As with central suspension assembly 30a described above, wheel sets 22, 24 may be rotationally mounted to axles 23, 25, respectively. The torsional insert tubes inside tubes 261, 262 may be fixed with respect to central suspension assembly 300 by end plugs 80, 82, 84, 86 as described above, and the elastomeric cords inside tubes 261, 262 may be of variable compressibility and may provide torsional resistance to rotation of tubes 261, 262 with respect to the torsional insert tubes. With this arrangement, when the axle arms 250, 252 are urged in a rotational motion (e.g., when wheels 22, 24 encounter a discontinuity in the ground terrain being traversed), such rotation is torsionally resisted due to compression of the elastomeric cords between tubes 261, 262 and the respective torsional insert tubes, yet such elastomeric cords may enable axle arms 250, 252 to rotate sufficiently to absorb wheel bounce and vibration.

Referring to FIGS. 6-8, another rotary cutter 310 is shown. Rotary cutter 310 may have a deck 312 mounted to a frame 314 and a cutter blade (not shown) mounted through each of openings 316 and 318. Rotary cutter 310 may have a torsional suspension system 360 including a transverse tube 320 pivotally mounted to frame 314. An arm 354 may be fixed to transverse tube 320, and arm 354 may be connected to a hydraulic or pneumatic cylinder (not shown) configured for raising and lowering tube 320 with respect to frame 314 via limited rotation about a transverse axis similar to that described above in connection with rotary cutter 10. At or near one end of tube 320, a wheel 330 may be rotationally mounted to an axle 328 of an axle arm 326 mounted to tube 320 via a torsion assembly 322 as described further below. Similarly, at or near another end of tube 320, a wheel 330 may be rotationally mounted to an axle 332 of an axle arm 334 mounted to tube 320 via a torsion assembly 324. Torsion assembly 322 may have a clamp formed by a pair of brackets 336 and 338 which may be fastened about tube 320 via bolts 344 and nuts 346 with an elastomeric cord 348 disposed in each of four spaces formed between the brackets 336, 338 and tube 320. Torsion assembly 324, having brackets 340 and 342 and elastomeric cords 348, may be configured similar to torsion assembly 322, as shown. Because each substantially square clamp is sized and shaped to closely fit about tube 320 with the elastomeric cords 348 held snugly in place between the clamp and tube 320, when the axle arm 326 or 334 is urged in a rotational motion (e.g., when either of wheels 330 encounters a discontinuity in the ground terrain being traversed), such rotation is torsionally resisted due to compression of cords 348 between the clamp and tube 320. In such a configuration, as rotary cutter 310 is pulled over an uneven terrain, torsion assemblies 322 and 324 may allow the axle arms 326 and 334 to move in limited rotational movement about tube 320 due to the presence of the elastomeric cords 348 compressed between the brackets 336, 338, 340, 342 and tube 320, thereby absorbing the shock and vibration that may arise as wheels 330 traverse the uneven terrain.

As shown in FIG. 8, brackets 336, 338 of torsion assembly 322 (and similarly, brackets 340, 342 of torsion assembly 324) may be configured in a C-clamp arrangement such that their flanges through which the bolts 344 are disposed are generally indexed with two opposite corners of tube 320. Alternatively, as shown in FIG. 9, brackets 350 and 352 may be configured in a triangular arrangement such that their flanges through which the bolts 344 are disposed are generally indexed with two opposite flat sides of tube 320. In some embodiments, brackets 336, 338, 340, 342 may have end closures (not shown) configured to constrain the elastomeric cords laterally within the span of the brackets. Of course, although tube 320 and the respective bracket clamps are shown having a substantially square cross-sectional shape, persons of ordinary skill in the art will understand that any suitable complementary shapes may be used in order to accommodate one or more elastomeric cords in one or more spaces formed between tube 320 and the respective bracket clamps for limited rotational movement of the clamps about tube 320 due to torsional compression of the elastomeric cords.

As persons of ordinary skill in the art will appreciate, a rotary cutter having a torsional suspension system as described herein may include one or more torsion cartridge assemblies (e.g., as shown and described in connection with FIG. 2) and one or more directly mounted torsion assemblies (e.g., as shown and described in connection with FIG. 3 or FIG. 6). Additionally, either a rotationally adjustable end plug (e.g., end plug 180, 182 as shown and described in connection with FIG. 3) or a fixed end plug (e.g., end plug 80, 82, 84, 86 as shown and described in connection with FIG. 2) may be used with either torsion cartridge assemblies or directly mounted torsion assemblies.

The embodiments described herein are some examples of the current invention. Various modifications and changes of the current invention will be apparent to persons of ordinary skill in the art. Among other things, any feature described for one embodiment may be used in any other embodiment. The scope of the invention is defined by the attached claims and other claims that may be drawn to this invention, considering the doctrine of equivalents, and is not limited to the specific examples described herein.

What is claimed is:

1. A rotary cutter apparatus comprising:
   a main frame;
   a deck supported by said frame;
   at least one rotary cutter mounted to said deck;
   at least one wheel; and
   a torsional suspension system connecting said at least one wheel to said frame, said suspension system comprising:
      an axle arm attached at a first end to said at least one wheel and at a second end to a tubular axle beam;
      a torsion cartridge having an outer housing sized to be removably secured in said tubular axle beam, an inner torsional tube extending along an inside length of said outer housing and configured to form cavities between said outer housing and said inner torsional tube, and elastomeric cords extending along said inside length of said outer housing within said cavities and configured for providing torsional resistance to rotation of said outer housing relative to said inner torsional tube; and
      at least one end plug configured for non-rotational engagement with said inner torsional tube, said at least one end plug being fixed with respect to said frame.

2. The rotary cutter of claim 1 wherein said tubular axle beam and said outer housing have complementary cross-sectional shapes configured to substantially prevent rotation of said tubular axle beam with respect to said outer housing.

3. The rotary cutter of claim 2 wherein said complementary cross-sectional shapes are substantially square.

4. The rotary cutter of claim 1 wherein said outer housing and said inner torsional tube comprise substantially square cross-sectional shapes configured to form said cavities in substantially triangular shapes.

5. The rotary cutter of claim 4 wherein said at least one end plug comprises a substantially square journal sized and shaped to closely fit within an open end of said inner torsional tube.

6. The rotary cutter of claim 1 wherein said at least one end plug is configurable in a plurality of different angular positions with respect to said frame.

7. The rotary cutter of claim 1 wherein said torsional suspension system comprises a plurality of torsional suspension assemblies each of which is mounted to said frame in a manner to permit limited rotation thereof about a transverse axis of rotation.

8. The rotary cutter of claim 7 wherein said transverse axis of rotation is the same for each of said plurality of torsional suspension assemblies.

9. The rotary cutter of claim 7 wherein said transverse axis of rotation is substantially perpendicular to a central longitudinal axis of said rotary cutter.

10. The rotary cutter of claim 7 wherein each of said plurality of torsional suspension assemblies comprises a tubular axle beam and a torsion cartridge removably secured therein, and wherein said tubular axle beams are spaced apart from one another.

11. A rotary cutter apparatus comprising:
    a main frame;
    a deck supported by said frame;
    at least one rotary cutter mounted to said deck;
    at least one wheel; and
    a torsional suspension system connecting said at least one wheel to said frame, said suspension system comprising:
       an axle arm attached at a first end to said at least one wheel and at a second end to a torsion insert housing;
       an inner torsional tube extending along an inside length of said torsion insert housing and configured to form cavities between said torsion insert housing and said inner torsional tube;
       elastomeric cords extending along said inside length of said torsion insert housing within said cavities and configured for providing torsional resistance to rotation of said torsion insert housing relative to said inner torsional tube; and
       at least one end plug configured for non-rotational engagement with said inner torsional tube, said at least one end plug being fixed with respect to said frame.

12. The rotary cutter of claim 11 wherein said axle arm is mounted at an intermediate position along a length of said torsion insert housing.

13. The rotary cutter of claim 11 wherein said at least one end plug comprises a plurality of holes each configured for alignment with a second hole in a mounting plate and a third hole in an arm of an axle pin, said axle pin having a shaft rotatably disposed through said mounting plate and said at least one end plug, and further comprising a bolt removably disposed in one of said plurality of holes of said at least one end plug and said second and third holes such that said axle arm is placed in a selected angular position with respect to said mounting plate.

14. The rotary cutter of claim 11 wherein said inner torsional tube and said torsion insert housing have substantially square cross-sectional shapes indexed with respect to each other such that corners of one are aligned with sides of the other, thereby forming said cavities at corners of said torsion insert housing.

15. The rotary cutter of claim 11 further comprising a torsional suspension assembly mounted to said frame and another wheel mounted to said torsional suspension assembly, wherein said torsional suspension assembly comprises a tubular axle beam and a torsion cartridge removably secured in said tubular axle beam.

16. The rotary cutter of claim 15 wherein said torsion cartridge comprises an outer housing sized to be removably secured in said tubular axle beam, a second inner torsional tube extending along an inside length of said outer housing and configured to form cavities between said outer housing and said second inner torsional tube, and elastomeric cords disposed within said cavities and configured for providing torsional resistance to rotation of said outer housing relative to said second inner torsional tube.

17. A rotary cutter apparatus comprising:
a main frame;
a deck supported by said frame;
at least one rotary cutter mounted to said deck;
at least one wheel; and
a torsional suspension system connecting said at least one wheel to said frame, said suspension system comprising:
a tube pivotally mounted to said frame;
a clamp comprising two or more brackets fastened about said tube;
at least one elastomeric cord disposed in a space formed between said tube and said clamp; and
an axle arm depending from one of said brackets, said at least one wheel being mounted to said axle arm.

18. The rotary cutter of claim 17 wherein said tube comprises a substantially square cross-sectional shape and wherein said brackets comprise a pair of facing C-shaped brackets fastened together at flanges which are indexed with opposite corners of said tube.

19. The rotary cutter of claim 17 wherein said tube comprises a substantially square cross-sectional shape and wherein said brackets comprise a pair of facing angle brackets fastened together at flanges which are indexed with opposite sides of said tube.

20. The rotary cutter of claim 17 further comprising an end closure configured to constrain said at least one elastomeric cord laterally within a span of said brackets.

* * * * *